Patented Feb. 4, 1941

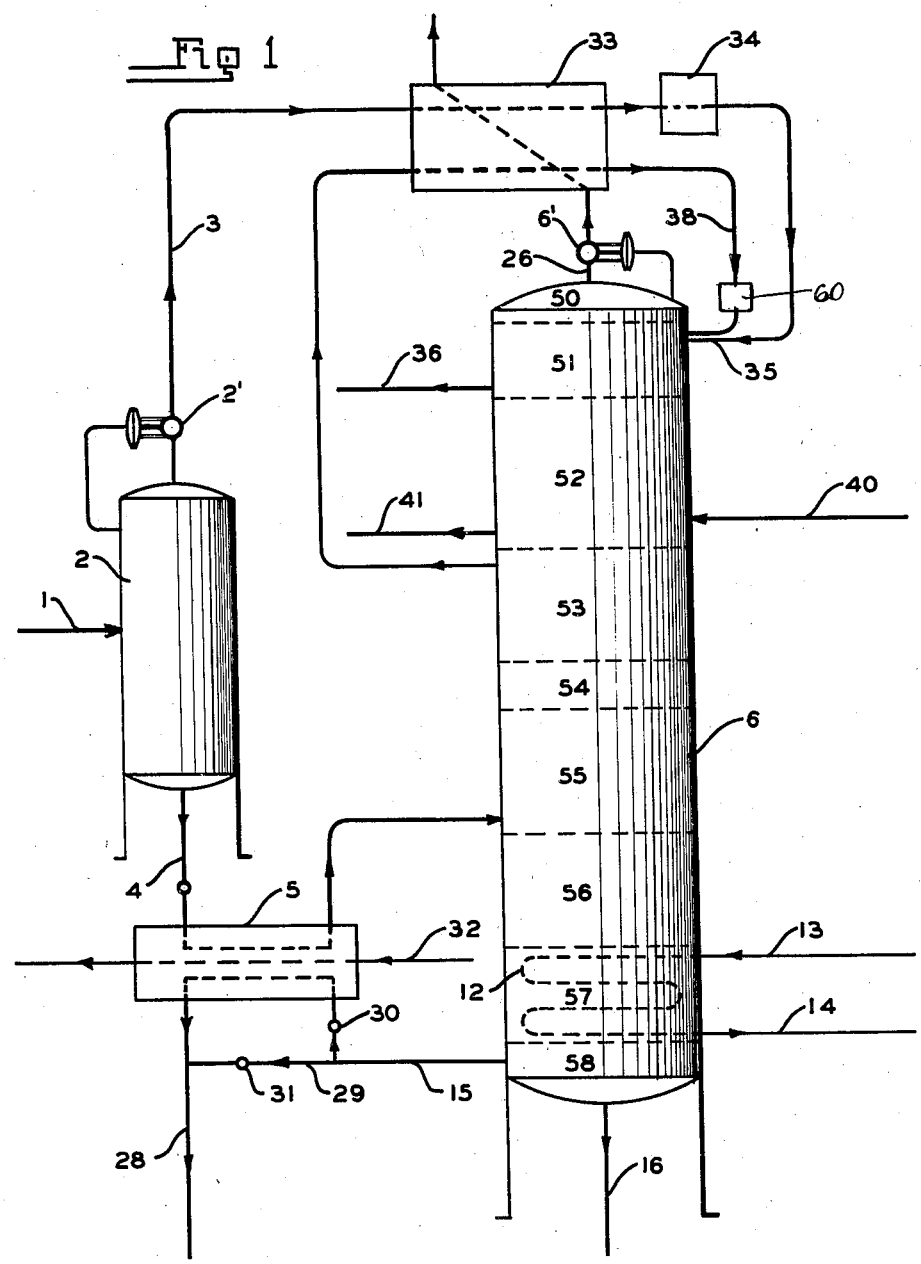

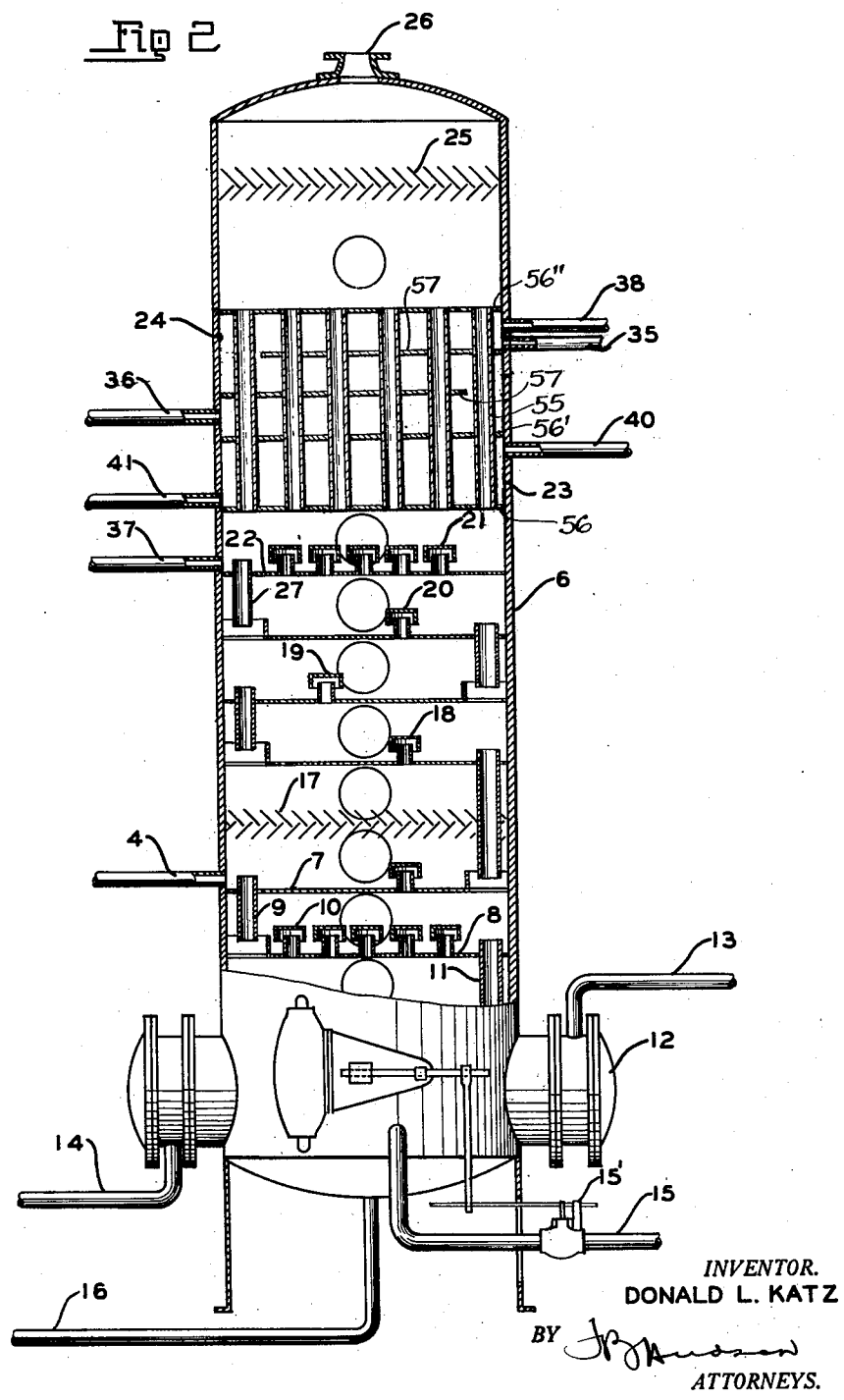

2,230,619

UNITED STATES PATENT OFFICE 2,230,619

PROCESS FOR SEPARATING GAS AND OIL

Donald L. Katz, Bartlesville, Okla., assignor to Phillips Petroleum Company, Bartlesville, Okla., a corporation of Delaware Application March 18, 1935, Serial No. 11,745

10 Claims. (Cl. 62—175.5)

This invention relates to a process for the separation of liquid and gases such as hydrocarbon oil and gas, and relates more specifically to a method for separating crude oil from dissolved and/or associated gas.

The production of crude oil involves the raising of crude oil from the underground reservoir to the surface of the earth. This crude oil may or may not be associated with free gas and may or may not contain dissolved gas upon arriving at the surface of the earth. Whenever gas is present, it is necessary to provide a process and suitable equipment to remove the gas from the crude oil. The equipment used for this purpose has been designated as a gas and oil separator.

A large variety of gas and oil separators have been used, and have been so designed that they will separate the oil and gas at approximately constant temperature and pressure, and such separators have further provided means for extracting liquid particles and mist from the gas phase, but no separators have been designed to control the composition of the gas phase and to regulate the vapor pressure of the crude oil.

The refining and natural gasoline industries have made use of fractionation for separating more volatile liquids from less volatile liquids. These industries also have removed small portions of gas from liquids by utilizing fractionating methods. The problem of separating gas from crude oil is different from the separation of gasoline from propane, ethane, and small amounts of methane. The problems presented are not similar because the quantities of gas produced with crude oil are from a few hundred cubic feet to thousands of cubic feet per barrel of crude. Also this gas usually contains a relatively large proportion of methane or non-condensable gases and the liquids concerned are of different compositions than those encountered in the previously used processes. The processes used by the refining and natural gasoline industries would not be adequate for separating crude oil and gas.

The object of my invention is to provide a process which enables me to regulate the composition of the gas separated from crude oil. Also my invention regulates the volatility of the crude oil within limits to make it less susceptible to losses while transporting or storing it.

Another object of my invention is to separate the crude oil and gas by utilizing an entrainment remover and mist extractor to prevent liquid particles from entering the gas line.

Another object of my invention is to provide means of cooling the rising vapor, and to return liquid as a reflux. My process also provides for removal of large quantities of gas from the crude oil under such conditions that but a little natural gasoline will be present in the gas. This part of the process enables me to operate the final stages of the gas and oil separator under more suitable conditions with smaller amounts of non-condensable gases.

Additional objects and advantages of my invention will be appreciated upon considering the following specification and attached drawings, forming a part thereof, and wherein like reference characters designate like parts of the invention throughout the several illustrations, and wherein:

Figure 1 shows a flow diagram of my process, and

Figure 2 is an enlarged detailed illustration of the separator used in connection with my invention.

In Figure 1 the liquid and gas come from a well in line 1. If there is associated or undissolved gas present, I prefer to put the mixture through a high pressure auxiliary separator 2, having a pressure regulator 2'. The auxiliary separator is of the type that separates the gas to line 3 and the oil to line 4, and brings the gas and liquid into approximately equilibrium at constant temperature and at some pressure above 200 lb. per sq. in. and under 1000 lb. per sq. in. In case the crude oil contains only dissolved gas at the pressure and temperature of the well head, then I prefer to dispense with the auxiliary separator and put crude with dissolved gas into line 4 directly. The oil passes through heater 5 which will heat the oil as required by the conditions of operation and will be carried by line 4 to the primary separator 6. The use of the auxiliary separator 2 permits condensation of gasoline constituents in the primary separator 6 at a much higher temperature than would be possible if it were not employed.

The pipe 1 leading to the auxiliary separator 2 may also be supplied with or augmented by a crude oil and gas mixture introduced by a pump if the well head pressure becomes low or any other conditions warrant such procedure.

With reference to Figure 1, it will be seen that the primary separator 6 comprises various zones or sections wherein 50 is a mist extractor, 51 is a dephlegmator, 52 is still another dephlegmator, 53 is a fractionating zone, 54 is a mist extractor, 55 is a flash chamber, 56 is another fractionating zone, 57 is a heating zone, and 58 is a settling zone. Separator 6 also includes a pressure regulator 6'. The liquid from heater 5 passes through line 4 into a flash chamber or zone 55 of the separator 6. The oil and gas approach equilibrium at the temperature and pressure of the chamber and at this point the liquid flows into zone 56 which comprises a fractionating section. I prefer bubble-cap plates for this purpose, but any device that will maintain liquid and vapor in intimate contact while flowing countercurrently will suffice.

With reference to Figure 2 it will be noted that the liquid flowing upon plate 7 overflows to plate 8 through down-spout 9, and flows across bubble caps 10 in contact with vapor and through the down-spout 11 to the plate below. The liquid leaves zone 56 through down-spout 11 and enters the heating zone 57 which contains a heat interchanger. I prefer to employ a tubular heater 12 using steam as the heating medium which enters through pipe 13 and leaves by pipe 14. If a higher temperature than that obtained by moderate pressure steam is desired, I may use a heater designed to extract heat from hot gases obtained from any suitable source.

The hot liquid leaving zone 57 separates into oil and settlings, the former going to line 15, the flow through which is controlled by a float valve 15', and the latter settles to the bottom, and is removed periodically through line 16.

The heating of the oil in zone 57 forms vapor which rises through the bubble caps 10 of the plates 8 in zone 56 and enters the zone 55 and mixes with the gas separating from the oil at this place. The combined vapors rise through zone 54 which serves as an entrainment remover and which prevents particles of liquid from being carried along with the vapor. After passing through vanes 17, the vapors enter zone 53 which is a fractionating zone. Again I prefer to use bubble cap plates but other devices will serve the purpose. The vapors rise through bubble caps 18, 19, 20 and 21, interchanging the less volatile constituents for the more volatile constituents of the liquid in countercurrent flow. The vapors leave the top plate 22 of zone 53 and enter zone 52, which contains a dephlegmator 23, of a vertical tubular design and which is cooled by water flowing countercurrent to the rising vapors, which is supplied by pipe 40 and is removed by pipe 41. The vapors not condensed in zone 52 rise to zone 51 containing a dephlegmator 24 similar to the one in zone 52 and which is cooled by some suitable refrigerant. The dephlegmator comprises a vertical tube extending through plates 56, 56' and 56'' separating the dephlegmating zones, for the passage of vapors to be cooled out of contact with the cooling medium. Plates 56 and 56' define the water cooled zone and 56' and 56'' define the refrigerant cooled zone which is provided with a series of baffles 57 to produce countercurrent flow of the refrigerant. The gas which is not condensed in zone 51 rises to zone 50, which contains a system of baffles 25 to remove entrained liquid particles or mist. The dry gas then leaves through the line 26.

The liquid condensed in zones 51 and 52 runs down to plate 22 and through down-spout 27, and after flowing countercurrent to the rising vapors and after being stripped of its more volatile constituents, reaches chamber 55 and mixes with the incoming fluid.

The oil leaving the primary separator 6 through line 15 flows through heat exchanger 5 and to line 28 as a low vapor pressure stable crude. If the crude from 15 produces too much heat, valve 30 positioned therein is closed, and I by-pass some of the crude through line 29, which is controlled by valve 31. If the crude contains insufficient heat, I add auxiliary heat through line 32.

The cooling of zone 52 may be accomplished by any suitable means. I prefer to utilize the high pressure gas from line 3 as a cooling medium if it is not desired for other purposes. The high pressure gas is cooled in heat exchanger 33 and expanded through valve 34 and then sent through line 35 into zone 51. The low pressure gas exhausts through line 36. In the event this gas is not available or it gives insufficient cooling, I prefer to remove liquid from the separator off the top plate 22 through line 37. This liquid is cooled in heat interchanger 33 and is carried by pipe 38 through expansion valve 60 to be vaporized in zone 51 of the primary separator. It should be appreciated that lines 35 and 38 could be coincident as the top portion of the dephlegmator is cooled by one of several processes, and the cooling medium through the dephlegmator would have the same route even though it came from different sources. If my separator is operating such that this liquid contains very small amounts of pentanes and heavier constituents, I use the vaporized liquid as fuel. Otherwise I install a compression unit which liquefies the vapors and utilizes water to remove the heat from the condensing vapors and recycles the condensate through the dephlegmator. If any other suitable refrigerant is readily available I could use it with or in place of these methods.

The design and size of equipment must be such that the velocities of fluids through heat exchangers is suitable for satisfactory heat exchange, and the bubble caps, separator diameter, plate spacings and line capacities must be such that with a given separation the fluid velocities are not high enough to cause excessive entrainment of liquid particles in the gas phase or excessive pressure drops through fluid lines.

My process of removing gas from liquid is flexible and adaptable to any gas and crude mixture and gives desired compositions of gas or specific vapor pressure crudes. The variables are composition of well fluid, operating pressure on auxiliary separator, operating pressure or primary separator, temperature of vapors leaving primary separator, temperature of oil leaving primary separator, vapor pressure of crude, composition of gas, amount of cooling in dephlegmators and size of fractionating sections. These variables are dependent on each other and the results desired.

I regulate the operating pressure on the auxiliary separator so that the pressure is greater than that of the primary separator and as low as possible without allowing the gas phase to contain more than negligible percentages of pentanes and heavier constituents. These pressures are in the range of 200 to 1000 lb. per sq. in. The operating pressure of the primary separator is dependent upon the composition of the well fluid, temperatures of the crude and gas leaving the separator, and the separation desired. The pressure and temperature at the top of the dephlegmators must be such that under these conditions the gas leaving the separator is at its dew or initial condensation point. The pressure and temperature of the crude leaving the bottom of the separator must be such that the constituents of the crude will exert a vapor pressure at this temperature equal to the operating pressure, and will exert the desired vapor pressure at the reference temperature. I find that it is possible to fix the composition of the fluid to the primary separator and either the vapor pressure of the crude or the composition of the gas leaving the separator. I also find that I may fix the composition of the gas in terms of pentanes and heavier and vary the vapor pressure of the crude by varying the amounts of propane and butane in the gas and crude. The control of the amounts of propane, butane and pentane in both the gas and liquid will depend not only on temperatures and pressures but also upon the amount of heat withdrawn from the dephlegmators and the sizes of the fractionating sections.

I find that a crude entering the primary column saturated with gaseous hydrocarbons at 500 lb. per sq. in. will be separated into a crude with a vapor pressure less than 10 lb. per sq. in. abs. at 80° F., and a gas containing negligible amounts of pentanes and heavier if the column is operated at pressures between 300 and 500 lbs., temperatures of 40–60° F. at top of dephlegmator, and temperatures of 300–450° F. for crude leaving separator. The heat withdrawn from vapors in the dephlegmators gave a reflux ratio in upper fractionating section of 1:1 to 2:1 on a molal basis and approximately five plates were used in each fractionating section.

What I claim and desire to secure by Letters Patent is:

1. A process for the separation of effluents from an oil well into a dry gas and a liquid comprising crude oil and containing substantially all of the gasoline constituents originally present therein, the same comprising introducing said effluents into a high pressure auxiliary separator, maintaining therein sufficient pressure to separate said effluents into a gas and liquid phase, passing said liquid phase into a second separator, heating the bottom of said separator, cooling the top of said separator by expanding the high pressure gas separated in said auxiliary separator in non-contact heat exchange relation with the vapors present therein, removing crude oil from the bottom of said separator substantially free from normal gaseous constituents and containing substantially all the gasoline constituents originally present therein and removing substantially dry gas from the top of said tower containing substantially no gasoline constituents.

2. A process for the separation of effluents from an oil well into a dry gas and a liquid comprising crude oil and containing substantially all of the gasoline constituents originally present therein, comprising passing said effluents into a first separating zone, maintaining sufficient pressure in said first separating zone to separate said effluents into a dry gas and a liquid containing substantially all of the gasoline content of said effluents, introducing said liquid into a second separating zone maintained at a lower pressure, the temperature increasing from top to bottom of said second separating zone produced by heating the bottom of said zone and cooling the top of said zone by taking condensed vapors from said second zone, and vaporizing the same through a non-contact heat exchanger in the top of said second zone, and withdrawing from said second zone substantially dry gas and crude oil substantially free from normal gaseous constituents and containing substantially all the original gasoline constituents.

3. A process for separating the effluents from an oil well into a dry gas and a liquid comprising crude oil and containing substantially all of the gasoline constituents originally present in said effluents, comprising introducing said effluents into a first separating zone, maintaining a high pressure in said zone sufficient to separate said effluents into a dry gas and a liquid containing substantially all of the original gasoline constituents, passing said liquid into a second separating zone maintained at a lower pressure, cooling the vapors from said first separating zone to produce a cooling medium, removing condensed vapors from said second zone to produce a second cooling medium, and introducing both said cooling mediums into said second zone in non-contact, heat exchange relation therewith to cool the top portion thereof.

4. A process for the separation of the effluents from an oil well into a substantially dry gas and a liquid comprising crude oil and containing substantially all the gasoline constituents originally present therein, the same comprising initially passing the effluents from an oil well into a separating zone wherein a high pressure is maintained and separating said effluents into a gas and a liquid phase, passing said liquid phase only into a second separating zone having an increase in temperature from top to bottom and maintaining such a pressure therein that the gasoline constituents of gaseous vapors given up by the crude will be ultimately retained in the crude and non-condensable gases will be removed from the crude by the temperature differential in the said separating zone.

5. A process for the separation of the effluents from an oil well into a dry gas and a liquid comprising crude oil and containing substantially all the gasoline constituents originally present therein, the same comprising the steps of initially passing the effluents from an oil well into a separating zone, maintaining in said zone a pressure sufficient to cause therein a separation of said effluents into a gas and a liquid phase, which liquid phase contains substantially all the original gasoline constituents present in the free gas of the effluent, passing said liquid phase only into a second separating zone, heating the bottom of said separator, and cooling the top of said separator so as to have an increase in temperature from top to bottom of said second separating zone.

6. A process for the separation of the effluents from an oil well into a dry gas and a liquid comprising crude oil and containing substantially all the gasoline constituents originally present therein, the same comprising the steps of initially passing the effluents from an oil well into a separating zone, causing therein a separation of said effluents into a gas and a liquid phase, passing said liquid phase into a second separating zone, heating the bottom of said separator, cooling the top of said separator by means of the expansion of the gas from the first separating zone and preventing contact between said expanded gas and the contents of said second separating zone.

7. A process for the separation of effluents from an oil well into a dry gas and a liquid comprising crude oil and containing substantially all of the gasoline constituents originally present therein, the same comprising introducing said effluents into an auxiliary separator operating under a pressure within the range 500–1000 pounds per square inch causing therein a separation of the effluents into a gaseous and liquid phase containing substantially all of the gasoline content initially present in the effluents, introducing said liquid phase only into a second separator maintained at a pressure of from 300–500 pounds per square inch, heating the bottom of said separator, cooling the top of said separator so as to have an increase in temperature from top to bottom within the limits 40° F. at the top and 450° F. at the bottom.

8. In a process for the separation of the effluents from a natural source of hydrocarbons into a substantially dry gas and a liquid containing substantially all the constituents having boiling points in and above the gasoline boiling range, the steps which comprise passing the effluents from a well producing a hydrocarbon mixture under a high pressure, and containing normally gaseous hydrocarbons and substantial amounts of normally liquid hydrocarbons, into a separating zone wherein a pressure between 200 and 1000 pounds per square inch is maintained and separating said effluents into a dry gas and a liquid containing substantially all the gasoline content of said effluents, introducing said liquid into a second separating zone maintained at a lower pressure, supplying heat to the bottom of said second separating zone, cooling the top of said separating zone by expanding at least a portion of the high pressure gas separated from said first separating zone in indirect heat exchange relation with the vapors present therein, removing a hydrocarbon liquid from the bottom of said separating zone substantially free from normally gaseous constituents and containing substantially all the normally liquid constituents originally present in said effluents, and removing substantially dry gas from the top of said separating zone containing substantially no normally liquid constituents.

9. A process for the separation of the effluents from a natural source of hydrocarbons into a substantially dry gas and a liquid containing substantially all the constituents having boiling points in and above the gasoline boiling range, which comprises passing the effluents from a well producing a hydrocarbon mixture under a high pressure and containing normally gaseous hydrocarbons and substantial amounts of normally liquid hydrocarbons into a separating means wherein a pressure between about 500 and 1000 pounds per square inch is maintained and therein separating said effluents into a gas and a liquid phase, passing said liquid phase only into a second separating means maintained at a lower pressure and having an increase in temperature from top to bottom and maintaining such a pressure therein that the gasoline constituents of gaseous vapors given up by the liquid phase will be ultimately retained in the liquid phase and noncondensable gases will be removed from the liquid phase by the temperature differential in the said second separating zone.

10. In a process for the separation of the effluents from a natural source of hydrocarbons into a substantially dry gas and a liquid containing substantially all the constituents having boiling points in and above the gasoline boiling range, the steps which comprise passing the effluents from a well producing a hydrocarbon mixture under a high pressure and containing normally gaseous hydrocarbons and substantial amounts of normally liquid hydrocarbons into a separating means wherein a pressure between about 500 and 1000 pounds per square inch is maintained and separating said mixture into a dry gas and a liquid containing substantially all the gasoline content of said mixture, passing said liquid phase only to a flash chamber operated at a lower pressure, removing a liquid from said flash chamber and introducing it to a first fractionating zone, removing a vapor from said flash chamber and introducing vapor into a second fractionating zone, removing a vapor from the top of said first fractionating zone and introducing said vapor into said flash chamber, removing a liquid from the bottom of said second separating zone and introducing said liquid into said flash chamber, removing a dry hydrocarbon gas from the top of said second fractionating zone, and removing a hydrocarbon liquid from the bottom of said first fractionating zone substantially free from normally gaseous constituents and containing substantially all the gasoline constituents originally present in said hydrocarbon mixture.

DONALD L. KATZ.